United States Patent [19]

Lindenthal

[11] Patent Number: 4,705,490
[45] Date of Patent: Nov. 10, 1987

[54] HOOKE'S-TYPE JOINT FOR A UNIVERSAL SHAFT

[75] Inventor: Hans Lindenthal, Heidenheim, Fed. Rep. of Germany

[73] Assignee: J. M. Voith GmbH, Fed. Rep. of Germany

[21] Appl. No.: 811,028

[22] Filed: Dec. 19, 1985

[30] Foreign Application Priority Data

Dec. 20, 1984 [DE] Fed. Rep. of Germany ....... 3446495

[51] Int. Cl.$^4$ .............................................. F16D 3/41
[52] U.S. Cl. .................................. 464/132; 384/455; 464/136
[58] Field of Search ....................... 384/454, 455, 622; 464/14, 128, 129, 130, 131, 132, 136

[56] References Cited

U.S. PATENT DOCUMENTS

| | | | |
|---|---|---|---|
| 3,074,255 | 1/1963 | Reinecke | 464/128 |
| 4,077,235 | 3/1978 | Kleinschmidt et al. | 464/128 X |
| 4,129,343 | 12/1978 | Janssen | 464/132 X |
| 4,138,863 | 2/1979 | Olson, Sr. | 464/130 |
| 4,144,724 | 3/1979 | Armasow et al. | 464/128 |

FOREIGN PATENT DOCUMENTS

| | | |
|---|---|---|
| GM1858494 | 4/1962 | Fed. Rep. of Germany . |
| 2642964 | 3/1978 | Fed. Rep. of Germany ...... 464/130 |
| 69190 | 10/1958 | France ................................ 384/455 |

Primary Examiner—Daniel P. Stodola
Attorney, Agent, or Firm—Ostrolenk, Faber, Gerb & Soffen

[57] ABSTRACT

A spider bearing having a radial bearing and a thrust bearing wherein the inner ring of the radial bearing rests on the outside axial end of the pin through the use of a flange against the end of the pin while another flange, axially disposed from the first, forms the inner race of the thrust bearing. Therefore, axial force is introduced via the end of the pin. The root of the pin, therefore, remains free of slots or joints, and without contact with the inner ring and the thrust bearing, such that upon deformation under load, tilting of the race does not occur. Therefore, parallelism of the thrust bearing races is maintained and uniform load-carrying capacity of the bearing is assured. The spider may, therefore, be shaped more optimally in the region of the root so as to obtain greater strength.

15 Claims, 11 Drawing Figures

4,705,490

HOOKE'S-TYPE JOINT FOR A UNIVERSAL SHAFT

BACKGROUND OF THE INVENTION

The present invention relates, generally, to a Hooke's joint having a spider which, via an anti-friction bearing, connects the fork arms of two articulation forks.

Hooke's joints are generally known and may be found, for example, in German Pat. No. AS26 07 515. Generally, in heavy machine construction such as rolling mills, universal joint shafts are not subjected to extremely high speeds of rotation. However, they are subjected to particularly high moments of rotation and variations in the moments of rotation. They are also subjected to pulsating stresses and transverse accelerations with large rapid changing angles of bending from one portion of the joint to another. Therefore, loads generally result in deformations of the form in the region of the flanges and also in the bores of the fork. These deformations are taken up by anti-friction-type bearings. As the bore within which the pin of the spider gear is disposed, widens, it begins to assume a non-circular shape. This deformation is transmitted to adjacent bearings. This therefore results in the eventual destruction of the cap with the rolling elements of the associated bearings being thrown out of joint or displaced. It has been found that anti-friction bearings do not generally fall as a result of insufficient load capacity but as a result of non-uniform distribution of load over the bearings or as a result of an excessively high percentage of load in given zones of the bearing. More particularly, when a thrust bearing is arranged at the root or base of the pin of a spider gear and therefore radially inward of the radial bearing, the bearing rests directly on a corresponding surface of the base of the pin. Therefore, as a result of bending of the pin, which results in corresponding edge pressures and local lifting off of the rollers in the area of the thrust bearing, errors in alignment result in the radial and thrust bearings. Further, the thrust bearing rings do not participate in this deformation of the pin and cannot threfore move into a position which assures optimum distribution of load over the rollers. Accordingly, the bearing will generally fall long before its calculated or designed life.

SUMMARY OF THE INVENTION

Accordingly, it is an object of the present invention to develop a bearing in a Hooke's-type joint, such that despite maximum stressing and deformations which generally occur on the spider gear with respect to the anti-friction bearings in the fork as well as the thrust bearing, will operate during its entire design life.

Further, it is an object of the present invention and it would be advantageous to have a bearing in a Hooke's-type joint which facilitates simple mounting as well as easy maintenance.

Additionally, it is an object of the present invention and would be advantageous to have a Hooke's-type joint for a universal joint shaft, comprising a spider having pins and a root portion at the base of each of the pins, articulation forks having fork arms with bores disposed in the arms for receiving the pins, an inner ring disposed adjacent the pins and having a stop formed by a first flange at the outer end of the pin wherein the first flange is radially directed toward the axis of the pin and a second flange is axially disposed away from the first flange and radially directed away from the axis of the pin, an outer ring secured against axial displacement in the bore and being radially outwardly disposed from the inner ring and forming a radial inner race between the second flange and the outer ring, a radial bearing roller disposed between the inner ring and the outer ring and a thrust bearing roller disposed in the race.

BRIEF DESCRIPTION OF THE DRAWINGS

Reference may be now had to the accompanying drawings in which.

DETAILED DESCRIPTION OF THE PREFERRED EMBODIMENT

Figure 1:
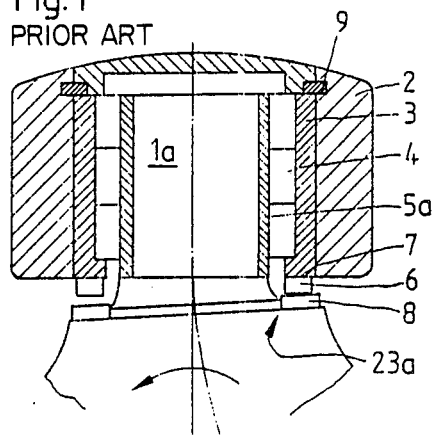
FIG. 1 diagrammatically shows a spider and bearing in accordance with the prior art.

In accordance with the present invention, the inner ring of a radial anti-friction-type bearing is placed on the pin of the spider gear directly adjacent a flange which acts as a stop. Disposed at the radially inner region of the inner ring is another flange which utilizes a race for the rollers of a thrust bearing. This, therefore, provides an advantage in that the spider gear is no longer utilized as direct support for the two rings of a thrust bearing. Further, the maximum deformation which occurs at the root of the pin and therefore at the transition region between two pins does not entail direct displacement or tipping of the thrust bearing ring. Rather, in accordance with the present invention, the inner ring of the radial bearing and a thrust bearing ring are combined into a single or unitary structural part. A bearing sleeve consisting of an inner ring of the radial bearing and a thrust bearing ring is centered about the diameter of the pin and fixed axially via the end of the pin. Therefore, upon being subjected to loads, the axis of the bearing sleeve forms a tangent to the line of the bending of the pin either at the end of the pin or in the region of the radial bearing. Further, upon deformation the inner ring along with the thrust bearing ring will always assume the position of the end of the pin since the bearing sleeve, or the thrust bearing ring which is integrated with the bearing sleeve, has no direct seat on the bottom of the spider. In this manner, the planes of the two thrust bearing rings always remain parallel since the two rings of the radial bearing also retain their fixed relationship. Accordingly, unilateral load-bearing by the thrust bearing is avoided.

The bearing sleeve which acts as a support for the thrust bearing affords an additional advantage in that upon deformation of the forks, with possible oblique positioning of the axis of the bores due to circumferential or transverse forces, the thrust bearing rollers will not be loaded on one side, since the bearing sleeve itself is generally elastically resilient, particularly in the cylindrical portion and in the region of the transition to the flange which forms the thrust bearing ring. Additionally, since the thrust bearing ring is not mounted directly on the root of the pin, the transition region on the spider gear between two pins can be manufactured much more closely to operating conditions in light of the actual loading requirements as well a being designed for maximum dynamic and static stresses. Since the resting surface for a thrust bearing ring has been eliminated, a large transition radii can be provided. Further, there is also improved axial support of the spider with the result that the spider gear is now strengthened.

Further, since the radial bearing and the thrust bearing are now formed as a single unit, the bearing sleeve can be premounted as a single structural part or maintained as a spare part. Additionally, introduction of the spider into the forks is also simplified due to the elimination of the impeding seat of the thrust bearing even where the fork has an undivided boss. Also, in an alternate embodiment, in order to obtain a bearing which is as free as possible from deformation under load without a reduction in load carrying capacity, the bearing sleeve may be provided with a firm seat on the surface of the pin in the radial outer region of the pin. A fluid is then introduced under high pressure into the seat so as to force the bearing sleeve to be axially displaced and thereby adjusting the axial plane of the thrust bearing.

Referring now to FIG. 1, there is shown a prior art spider gear or mounting under load. The spider has a pin 1a which is connected to the fork boss 2 via an anti-friction bearing arrangement. This bearing arrangement consists of a radial bearing having an outer ring 3 and rolling elements consisting of cylindrical rollers 4, an inner ring 5a, a thrust bearing with a bearing ring 8, thrust bearing rollers 6 and a race 7 which is located on one side of the outer ring 3 of the radial bearing. The thrust bearing ring 8 is disposed about the center of the root 23a of the pin 1a. It has been found that upon loading by a moment of rotation acting in the direction indicated by the arrow (clockwise when viewed from the top of FIG. 1), the radial bearing which is firmly enclosed by the fork boss 2, does not experience any bending in the region of the rolling elements 4. This, therefore, requires that deformation take place at the root 23a of the pin 1a and therefore in the region of transition from the cylindrical part of the spider to its solid part. Therefore, there is produced an open gap within a thrust bearing or viewed alternately, a lack of parallelism between the planes of the travel surfaces 7 and 8. This therefore produces unequal distribution of the load which, as mentioned, is disadvantageous. Further, the slots or joints in the region of the root 23a of the pin 1a about the inner ring 5a and the thrust bearing ring 8 reduce the overall strength of the spider.

Figure 2:
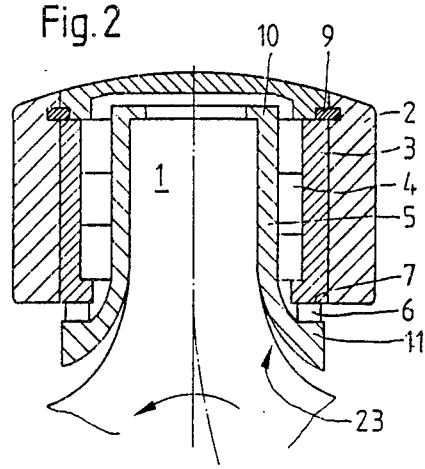
FIG. 2 diagrammatically shows a spider and bearing in accordance with the present invention.

Referring now to FIG. 2 there is shown a diagrammatic representation of a spider bearing in accordance with an embodiment of the present invention. Shown is a radial bearing comprising outer ring 3, rolling elements 4, and an inner ring 5 which connects the pin 1 to the fork boss 2. The outer ring 3 has a race 7 for the thrust bearing rollers 6 thereby forming a thrust bearing. The radially inner race of the thrust bearing is developed as a flange 11 which is part of the inner ring 5. The inner ring 5 has a radially outward extending flange 10 which extends towards the axis of the pin 1. When mounted, the flange 10 serves as a stop on the end of the pin 1 as well as transmitting an axial force which comes from the spider through the shank of the inner ring 5 and the flange 11. This force is conducted by the rollers 6 to the outer ring 3 and the retainer 9 to the fork. Accordingly, since the flange 11 is not in contact with the root 23 of the pin 1, deformation at the root 23 of the pin 1 does not produce any change in position of the thrust bearing relative to the radial bearing. Therefore, the transition from one pin 1 to the other remaining pins is free of slots or joints and can thereby be shaped optimally as mentioned with a large radii of curvature.

Figure 3:
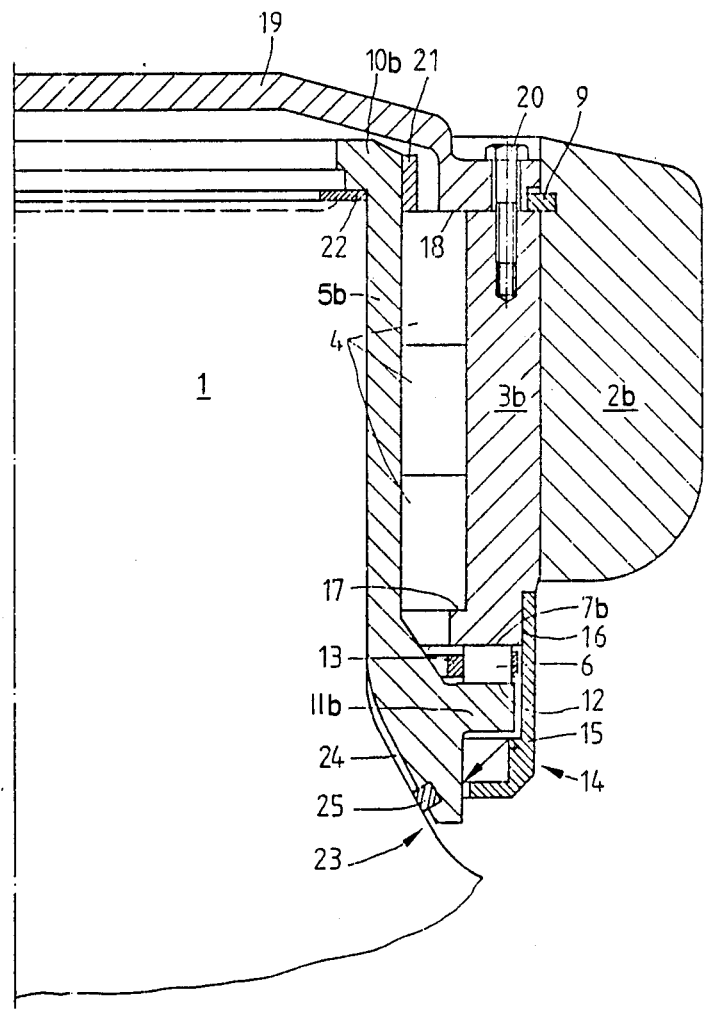
FIG. 3 shows the bearing of the present invention in a longitudinal section taken through FIG. 2.

Referring now to FIG. 3, there is shown an alternate embodiment of the present invention. All parts in FIG. 3 and subsequent figures which correspond to previously numbered parts will be provided with the same reference number. Disposed between the pin 1 and the boss 2b, there is a radial bearing comprising an outer ring 3b, rolling elements 4 and an inner ring 5b. The inner ring 5b has two flanges 10b, 11b. Flange 10b extends towards the axis of the pin while flange 11b, which is located at the radially inner end of the inner ring 5b, extends away from the axis of the pin. The flange 11b has a radial surface 12 which is used as an inner race for the thrust bearing roller 6. Roller 6 rest radially outward against race 7b on the end of outer ring 3b. Flange 10b of the inner ring 5b is utilized as a stop upon the mounting of the inner ring 5b and, during operation, take up axial forces present from or exerted by one of the pin 1 and conducts them to the shank of the inner ring 5b. These forces also pass to the flange 11b, the roller 6, the outer ring 3b and an axial retainer 9. Many types of retainers 9 may be used, although preferably a spring snap ring is employed. Guidance of the rolling elements 4 of the radial bearing is provided by two radial surfaces, flange 17 on outer ring 3b and surface 18 of bearing cap 19. The bearing cap 19 is shown as being fastened on the outer ring 3b by screws 20, although other types of fastening mechanisms can and may be utilized. The retainer 9 is clamped between a groove on the bearing cap 19 and the outer ring 3b. A sealing arrangement 14 provides radial inner sealing of the bearing and comprises a cylindrical sleeve 15 which is fastened onto the outer ring 3b by centering means or device 16. The sleeve 15 has sealing elements which rest along a diameter of the inner ring 5b radially inward of the flange 10b. The outer diameter of the sleeve 15 is less than the outside diameter of the outer ring 3b, although a diameter which is greater than the outside diameter of the ring 3b may be utilized. In this manner, a complete bearing assembly is formed and comprises outer ring 3b, rolling elements 4, inner ring 5b and rollers 6 which are assembled together and held by sealing arrangement 14. Further, a holding ring 21 which is located on the radially outer region of the race of the inner ring 5b may be used, thereby presenting a bearing in a closed unit ready for mounting. Therefore, upon assembly of the spider, this unit can be pushed from the outside over the pin after the spider has been introduced into the bores of the fork. Rollers 6 of the thrust bearing are held in by roller cage 13 which is in turn guided on the inner surface of the sleeve 15 or on a surface of the inner ring 5b.

Adjustment of bearing play in the thrust bearing and therefore between surfaces 7b and 12 is through the use of a disk 22. The disk 22 is inserted between the flange 10b and the end of the pin 1 and is dimensioned so as to provide precise centering of the spider thereby minimizing any imbalances which may be present. A slot or gap 24 is provided as room for deformations in the region of the root 23 adjacent the inner ring 5b. Since this slot 24 may allow the introduction of dirt, moisture and other contaminants, a seal is provided by sealing ring 25 which is inserted within the body of the inner ring 5b adjacent the root 23.

Figure 4:
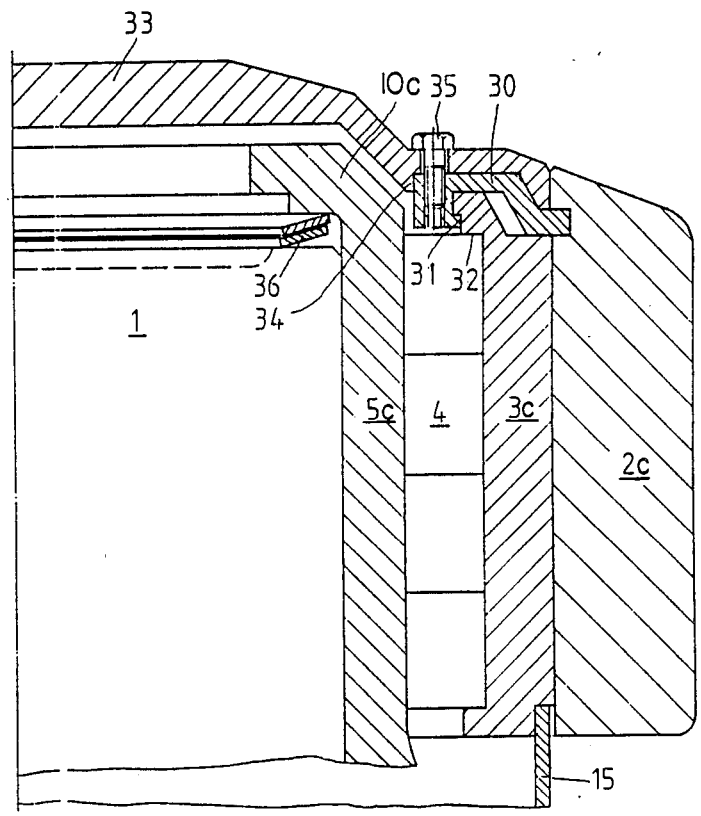
FIG. 4 is an alternate embodiment of the bearing as shown in FIG. 2.

Referring now to FIG. 4, there is shown another embodiment of the present invention. Here, axial securing of the outer ring 3c in the fork 2c is through use of a multipartite ring 30 (as opposed to the unipartite retaining ring as shown in FIG. 3). The ring 30 at its outer diameter engages a groove in the fork and is clamped at its inner diameter through the use of claw coupling 31 to the outer ring 3c. The outer ring 30 has a flange 32 thereby accommodating the rollers 4. The bearing cap 33 is profiled so that after fastening by screws 35, the individual parts of the retaining ring 30 are held fast through the use of a centering device 34 in its mounted position. The bearing cap 33 and the retaining ring 30, thereby present a structural unit having improved reliability under high axial forces as well as simplifying the mounting thereof. Another manner of adjusting the bearing play of the thrust bearing is through the use of a spring, which is preferably a cup spring 36, and which is inserted between the flange 10c of the inner ring 5c and the end of the pin 1. This therefore reduces the play in the thrust bearing and provides resilience in the event of deformation as previously mentioned.

Figure 5:
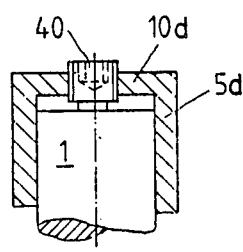
FIGS. 5-7 show alternate embodiments of adjustment mechanisms of the present invention.

Referring now to FIG. 5, there is shown an alternate embodiment of the present invention and more particularly an alternate means of adjusting the bearing play in the thrust bearing. Here, the flange 10d is widened towards the axis of the pin 1 and uses a screw 40, one end of which rests against the end surface of the pin. Before the bearing cap is mounted, the amount of desired play of the thrust bearing is adjusted to the desired tolerance.

Figure 6:
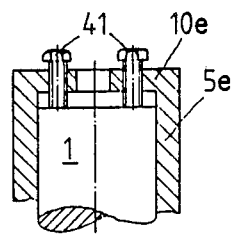

Referring now to FIG. 6, there is shown another alternate embodiment providing for adjustment in accommodating the bearing play in the thrust bearing. Shown is the use of a plurality of screws 41 in place of the single screw 40 (FIG. 5) with the screws 41 distributed over the circumference of the end surface of the pin 1. The screws 41 would be adjusted so as to provide the appropriate amount of axial play.

Figure 7:
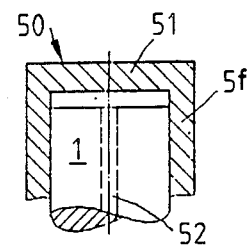

Referring now to FIG. 7, there is shown another alternate embodiment illustrating the adjustment of bearing play in the thrust bearing. It is seen that the first flange 10 of the inner ring 5, e.g., as in FIG. 2, has been widened to form a closed flange 51. Therefore, in FIG. 7 the inner ring 5c has an upper flange 51 which is widened to essentially form a cylinder 50. Accordingly, after mounting the pin 1 acts as a piston. Therefore, a pressure substance, such as pressurized liquid or compressed air, can now be forced into the space between the end of the pin 1 and the bottom of the closed flange 51. Introduction of the pressurized substance is preferably via a central hole 52 in the pin 1. This, therefore, results in a resilient application of the races 12 and 7 against the rollers 6 which thereby results in freedom from play.

Figure 8:
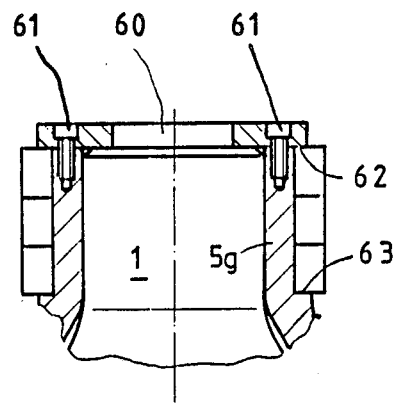
FIGS. 8-11 show additional alternate embodiments of the bearing sleeve of the present invention with various attachable structural parts.

Referring now to FIG. 8, there is shown an additional alternate embodiment in which the radially outer flange 10 of the inner ring, e.g., as in FIG. 2, is used as an independent detachable part 60 which is attached to the inner ring 5g. This attachment is via screws 61 provided at the end thereof, although other means of attachment may be used. The outside diameter of the flange is larger than the diameter of the roller race, thereby forming a stop rim 62 for the rollers 4 of the radial bearing. An additional stop rim 63 is arranged on the radially inner side of the roller race.

Figure 9:
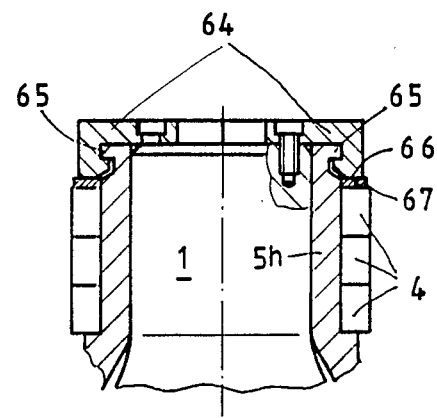

Referring now to FIG. 9, there is shown an additional alternate embodiment wherein the detachable part is a bipartite ring 64 which is fastened, via a claw-like coupling 65, on the inner ring 5h adjacent the front end of the pin 1. An axial stop rim 66 may be provided as shown for the rollers 4 of the radial bearing. A thin disk 67 is inserted between the rollers 4 and the rim 66 and assure a continuous stop surface for the rollers 4.

Figure 10:
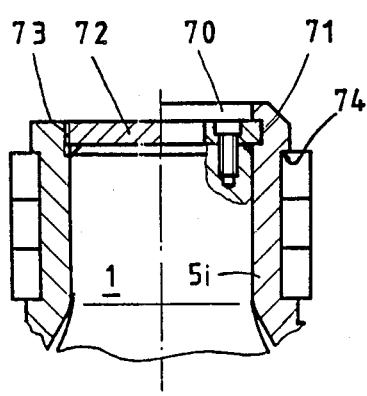

Referring now to FIG. 10, there is shown another alternate embodiment of the present invention which also allows for adjustment of the bearing play in the thrust bearing. FIG. 10 is shown as a right half and a left half in which the right half shows a multipartite ring 70 which is engaged by an annular groove 71 wherein the groove 71 opens towards the axis of the pin 1. The ring 70 is fastened on one end of the pin 1 in a manner similar to that in FIG. 9. However, in the left half of FIG. 10, there is shown an alternative attachment means other than by a screw. Here, attachment is via a thread 73 between the inner ring and a disk 72. The disk 72 is a single piece and permits direct adjustment of the play of the thrust bearing 6, 7, 11. Axial stop rims 74 are located in the region of the inner ring 5i. Adjustment of the play may be in accordance with that shown in FIGS. 3–6 through the use of a detachable flange.

Figure 11:
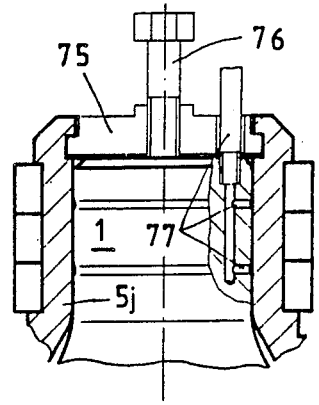

Referring now to FIG. 11, there is shown an additional alternate embodiment which is for attaching the inner ring 5j to the pin 1. Here, the ring 5j is fastened on the pin 1 by means of a tight seat, in which fluid under high pressure, such as oil, is forced between the mating seat surfaces via channels 77. In this manner, the tight seat of the inner ring 5J can be loosened upon mounting. The inner ring 5J can then be shifted axially by means of a flange disk 75 so as to adjust the bearing play or pretension in, e.g., a thrust bearing 6, 7, 11 as described in the previous embodiments. The flange disk 75 can be fastened either via a hooked-shaped claw by a bayonet closure as shown or by means of a thread 73 on the inner ring. Adjustment of the axial play is affected via a screw 76 against the end of the pin 1. The flange disk 75 along with the screw 76 may be removed after mounting with the result that the dead weight of the joint may be reduced. Additionally, instead of a tight seat of the inner ring 5J on the pin 1, cement attachment may also be used.

What is claimed is:

1. A Hooke's-type joint for a universal joint shaft, comprising:
   a spider having pins and a root portion at the base of each said pins, each said pin extending from its respective root portion in a radially outward direction with respect to said spider;
   articulation forks having fork arms with bores disposed in said arms for receiving said pins;
   an inner ring disposed adjacent each of said pins and having a stop for limiting axial entry of said pin within said inner ring, said stop also receiving axial forces between said inner ring and said pin, said stop being formed as a first flange at the radially outer end of said inner ring and being directed toward the axis of said pin;
   said inner ring also having a second flange axially disposed away from said first flange toward the root portion and directed away from the axis of said pin, said inner ring being shaped to space said second flange away from the pin and from the root portion of the spider and thereby permit bending deformation of said pin with respect to said root portion without said second flange and said root portion coming into contact;

an outer ring secured against the axial displacement in said bore and being outwardly disposed from said inner ring and from the axis of said pin, a thrust bearing race being formed between said second flange of said inner ring, and said outer ring;

radial bearing roller means disposed between a portion of said inner ring intermediate said first and second flanges thereof, and said outer ring; and thrust bearing roller means disposed in said thrust bearing race.

2. A device according to claim 1, wherein a seal is disposed for extending from a portion of said outer ring which is adjacent said race and to a portion of said inner ring radially inward of said second flange so as to enclose said race.

3. A device according to claim 1, wherein a bearing cap is adjacent that end of said pin which is opposite said root portion and is secured to said outer ring, and a retaining ring is disposed between said bearing cap and said outer ring thereby preventing axial displacement of said outer ring.

4. A device according to claim 3, wherein said bearing cap has a flange adjacent said radial bearing rollers thereby preventing axial outward displacement of said radial bearing rollers.

5. A device according to claim 1, wherein a bearing cap is adjacent that end of said pin which is opposite said root portion, being profiled to receive a retaining ring, said retaining ring being profiled to engage said outer ring such that bearing cap centrally positions said retaining ring and thereby positions said outer ring about the center axis of said pin.

6. A device according to claim 1, wherein a disk is disposed between the end of said pin which is opposite said root portion and said first flange thereby adjusting the axial height of said race.

7. A device according to claim 1, wherein at least one screw is disposed for engaging the end of said pin which is opposite said root portion thereby enabling the adjustment of the axial displacement of said race.

8. A device according to claim 1, wherein a spring member is disposed between said first flange and that end of said pin which is opposite said root portion.

9. A device according to claim 1, wherein said inner ring is cylindrical having one end closed thereby creating a substantially pressure-tight chamber between that end of said pin which is opposite said root portion and the end of said inner ring, and further comprising means for allowing the introduction and maintenance of pressurized fluid so as to accomplish axial displacement compensation of said race.

10. A device according to claim 9, wherein pressurized fluid is disposed between said inner ring and said pin.

11. A device according to claim 10, wherein a screw spindle is disposed at the end of said pin thereby allowing the axial displacement of said race to be adjusted.

12. A device according to claim 1, wherein a seal is disposed between said root portion and said inner ring.

13. A device according to claim 1, wherein said first flange is detachable from said inner ring.

14. A device according to claim 13, wherein said detachable first flange forms a stop rim thereby prevential axial displacement of the radial bearing rollers.

15. A device according to claim 14, wherein a disk is disposed between said radial bearing rollers and said detachable flange.

* * * * *